United States Patent Office 3,269,930
Patented August 30, 1966

3,269,930
POLYMERIZATION OF TRIBUTYLVINYLPHOS-PHONIUM HALIDES BY IONIZING RADIATION
Catherine Shuihua Hsia Chen, Stamford, Conn., assignor to American Cyanamid Company, Stamford, Conn., a corporation of Maine
No Drawing. Filed Sept. 20, 1963, Ser. No. 310,482
5 Claims. (Cl. 204—159.22)

This invention relates to a novel process for the production of vinyl phosphonium polymers. More particularly, this invention relates to a novel process for the production of polymers from vinyl phosphonium halides which comprises subjecting the halides, in the solid state, to ionizing radiation. Still more particularly, this invention relates to a novel process for the production of high molecular weight polymers prepared from monomers represented by the formula (I)

wherein X is a chlorine, bromine or iodine radical which comprises subjecting the halides, in the solid state, to ionizing radiation.

Various attempts have been made to polymerize monomers having a vinyl group connected directly to a phosphorus atom. In most instances, however, these previous attempts have not resulted in the production of high molecular weight polymers. Although various vinyl phosphonate esters have resulted in oligomers of molecular weights less than 5,000, even poorer results have been reported for diphenylvinylphosphine, diphenylvinylphosphine oxide and diphenylvinylphosphine sulfide.

The polymerization of tributylvinylphosphine halides via the use of free-radical generating catalysts and solution ionization radiation, while resulting in good yields of high molecular weight polymer, have presented numerous problems in regard to (1) the isolation and recovery of the polymers from the polymerization media and (2) the necessity for the use of an oxygen-free or inert atmosphere during the polymerization. The use of solution polymerization techniques necessitates the dissolution of the solid monomer in a suitable solvent such as water, the maintenance of an inert atmosphere and the subsequent recovery of the polymer from the media after polymerization by tedious methods such as dialysis followed by freeze drying, spray drying and the like.

I have now discovered that high molecular weight polymers can be produced from the monomers represented by Formula I, above, by utilizing my novel procedure wherein air may be present and no tedious isolation of the polymer from the monomer or reaction media is necessary.

It is therefore an object of the instant invention to present a novel process for the production of polymers from vinylphosphonium monomers.

It is a further object of the instant invention to present a novel process for the production of polymers from monomers represented by Formula I above which comprises subjecting said monomers, in the solid state, to ionizing radiation.

These and other objects will become more apparent to those skilled in the art upon reading the more detailed description set forth hereinbelow.

As mentioned above, I have discovered a method for the production of high molecular weight polymers from various vinylphosphonium halides by subjecting said halides, in the solid state, to ionizing radiation. My novel process is conducted at temperatures ranging from about −80° C. to about 150° C., preferably 0° C. to about 50° C. under atmospheric pressure. Although atmospheric pressure may be used, it is also possible to utilize subatmospheric or superatmospheric pressures. The reaction may preferably be carried out in the presence of air, however, one may utilize such gases as nitrogen, argon, neon, and the like to exclude the air from the reaction, if desired. Additionally, the polymerization may be conducted under vacuum.

The ionizing radiation may be utilizing in the form of X-rays, gamma-rays, electrons and the like and, regardless of the type of ionizing radiation used, a dosage of from about 0.01 to about 0.75 Mrad generally may be sufficient. Dose rates ranging from about 0.1 Mrad per hour to about 10.0 Mrads per minute may be utilized.

My novel process can be used for the production of homopolymers of the monomers set forth hereinabove and may also be utilized to produce copolymers thereof with two or more of said monomers, alone or in combination, with any other copolymerizable monomer which will form a solid solution with the vinylphosphonium halide. It can therefore be seen that my novel process is applicable to the production of homopolymers, copolymers, terpolymers and the like of the vinylphosphonium halides represented by Formula I, above, alone and with many other comonomers.

By utilizing my novel procedure, conversions up to 100% may be achieved. The reaction is relatively rapid and the process is very economical in that only a small amount of radiation is necessary in order to attain the high conversions mentioned above.

The polymers produced by the present invention have molecular weights varying over a very wide range. For instance, the polymers may have molecular weights ranging from about 50,000 to an excess of about 1,000,000, as determined by methods described in P. Debye, J. Appl. Phys., 15, 338 (1944); J. Phys. Chem., 51, 18 (1947) and B. H. Zimm, J. Chem. Phys., 16, 1093, 1099 (1948).

The following examples are set forth for purposes of illustration only and are not to be construed as limitations on the present invention. All parts and percentages are by weight unless otherwise specified.

Example 1

Crystalline tributylvinylphosphonium bromide is charged to a suitable reaction vessel and is irradiated in vacuum at 30° C. by X-rays at a dose rate of 0.17 Mrad per hour. The monomer is completely converted to polymer in 90 minutes utilizing a total dose of 0.26 Mrad. The resulting polymer has a weight average molecular weight of $4.8 \times 10^4$ and the G value is 5546.

Example 2

To a suitable reaction vessel is added crystalline tributylvinylphosphonium iodide. The crystals are irradiated in vacuum at 30° C. by X-rays at a dose rate of 0.17 Mrad per hour. Complete conversion of the monomer to polymer is accomplished in 50 minutes indicating a total dosage of 0.15 Mrad. The weight average molecular weight of the resultant polymer is $5.4 \times 10^4$.

Example 3

Following the procedure of Example 1, crystalline tributylvinylphosphonium chloride is irradiated. Complete conversion is accomplished in two hours utilizing a total dose of 0.34 Mrad. The weight average molecular weight of the polymer is $4.3 \times 10^4$.

Example 4

Utilizing the procedure of Example 2, tributylvinylphosphonium iodide crystals are polymerized to complete conversion at −40° C. with a total X-ray dose of 0.55

Mrad. The weight average molecular weight of the resultant polymer is $5.0 \times 10^4$.

Example 5

Again utilizing the procedure of Example 2, except that a dose rate of 0.14 Mrad per hour is employed, total polymerization of solid state tributylvinylphosphonium iodide is effected by a total dosage of 0.19 Mrad. The weight average molecular weight of the poly(tributylvinylphosphonium iodide) is $5.2 \times 10^4$.

Example 6

A solid solution of tributylvinylphosphonium bromide and tributylvinylphosphonium iodide, containing 49.7% of the bromide, is added to a suitable reaction vessel and irradiated in vacuum at 60° C. by X-rays at a dose rate of 0.28 Mrad per hour. Complete copolymerization to a copolymer is accomplished by a total dose of 0.28 Mrad.

Example 7

Following the procedure of Example 6, except that the solid solution contains 27.9% of the bromide, complete copolymerization is effected by a total dosage of 0.19 Mrad.

Example 8

Again following the procedure of Example 6, except that the solid solution contains 75.8% of the bromide, complete copolymerization is effected by 0.19 Mrad.

Example 9

The procedure of Example 6 is again followed except that 85% of the solid solution comprises the bromide. Complete copolymerization occurs with a total dosage of 0.19 Mrad.

Example 10

Again following the procedure of Example 6, except that 96.5% of the bromide is employed, complete copolymerization occurs after a dosage of 0.19 Mrad.

Example 11

Again following the procedure of Example 6, except that 41.1% of the bromide is used, complete copolymerization occurs after a dosage of 0.18 Mrad.

Example 12

Following the procedure of Example 6, except that a solid solution of tributylvinylphosphonium bromide and tributylvinylphosphonium chloride, containing 46.5% of the bromide is used, complete copolymerization results after a total dosage of 0.32 Mrad.

Example 13

Again following the procedure of Example 6, a solid solution of tributylvinylphosphonium chloride and tributylvinylphosphonium iodide containing 28% of the chloride, is copolymerized after subjection to a total dosage of 0.29 Mrad.

Example 14

To a suitable reaction vessel is charged crystalline tributylvinylphosphonium bromide. The crystals are subjected to X-rays at a dose rate of 0.28 Mrad per hour in vacuum at −23° C. Complete polymerization is accomplished by a total dose of 0.55 Mrad. The weight average molecular weight of the polymer is $5.4 \times 10^4$.

Example 15

To a suitable reaction vessel is charged crystalline tributylvinylphosphonium bromide. The crystals are subject to X-rays at a dose rate of 0.28 Mrad per hour in air (atmospheric) at 0° C. Complete polymerization is accomplished by a total dose of 0.28 Mrad. The weight average molecular weight of the polymer is $5.0 \times 10^5$.

I claim:

1. A method for the production of a high molecular weight polymer of a vinyl phosphonium halide which comprises contacting a solid state monomer having the formula

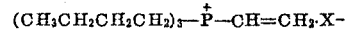

wherein X is selected from the group consisting of chlorine, bromine and iodine, with ionizing radiation.

2. A method for the production of a high molecular weight polymer of a vinyl phosphonium halide which comprises contacting a solid state monomer having the formula

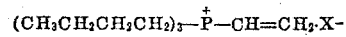

wherein X is selected from the group consisting of chlorine, bromine and iodine, with ionizing radiation at a temperature ranging from about −80° C. to about 150° C. and a dosage rate of from about 0.1 to about 10.0 Mrads per hour.

3. A method according to claim 1 wherein the monomer is tributylvinylphosphonium bromide.

4. A method according to claim 1 wherein the monomer is tributylvinylphosphonium chloride.

5. A method according 1 wherein the monomer is tributylvinylphosphonium iodide.

References Cited by the Examiner

Pellon et al.: Polymerization of Tributylvinylphosphine Bromide, August 10, 1963, Chemistry and Industry, London, No. 32, pp. 1358.

Fadner et al.: Polymerization in the Crystalline State, Journal of Polymer Science, vol. XLV, pp. 475–476, August 1960.

MURRAY TILLMAN, *Primary Examiner.*

SAMUEL H. BLECH, *Examiner.*

N. F. OBLON, *Assistant Examiner.*